United States Patent
Ishii

(10) Patent No.: US 10,256,938 B2
(45) Date of Patent: Apr. 9, 2019

(54) OPTICAL RECEIVER, OPTICAL TRANSCEIVER, AND OPTICAL SIGNAL RECEPTION CONTROL METHOD

(71) Applicant: Fujitsu Optical Components Limited, Kawasaki-shi, Kanagawa (JP)

(72) Inventor: Toshio Ishii, Yokohama (JP)

(73) Assignee: FUJITSU OPTICAL COMPONENTS LIMITED, Kawasaki-Shi (JP)

( * ) Notice: Subject to any disclaimer, the term of this patent is extended or adjusted under 35 U.S.C. 154(b) by 8 days.

(21) Appl. No.: 15/636,058

(22) Filed: Jun. 28, 2017

(65) Prior Publication Data

US 2018/0006756 A1 Jan. 4, 2018

(30) Foreign Application Priority Data

Jul. 1, 2016 (JP) .................................. 2016-131939

(51) Int. Cl.
*H04B 10/40* (2013.01)
*H04B 10/69* (2013.01)
*H04J 14/02* (2006.01)

(52) U.S. Cl.
CPC .......... *H04J 14/0221* (2013.01); *H04B 10/40* (2013.01); *H04B 10/69* (2013.01)

(58) Field of Classification Search
CPC ...... H04B 10/40; H04B 10/69; H04J 14/0221
USPC ............................................ 398/45, 79, 209
See application file for complete search history.

(56) References Cited

U.S. PATENT DOCUMENTS

| | | | | |
|---|---|---|---|---|
| 6,342,959 B1* | 1/2002 | Haxell | ................. | H04B 10/077 359/337 |
| 6,469,814 B1* | 10/2002 | Park | ..................... | H04B 10/077 398/79 |
| 2006/0016894 A1 | 1/2006 | Matsumoto | | |
| 2009/0236502 A1* | 9/2009 | Ishii | ..................... | H03G 3/3084 250/214 R |
| 2010/0129079 A1* | 5/2010 | Bato | ..................... | H04B 10/506 398/79 |
| 2010/0166425 A1* | 7/2010 | Onaka | ................. | H04J 14/0221 398/79 |
| 2012/0063771 A1* | 3/2012 | Sugaya | .............. | H04B 10/2935 398/26 |
| 2012/0121256 A1* | 5/2012 | Suzuki | ............. | H04B 10/07957 398/34 |
| 2012/0155864 A1* | 6/2012 | Pepeljugoski | ..... | H04B 10/0799 398/37 |

(Continued)

*Primary Examiner* — Amritbir K Sandhu
(74) *Attorney, Agent, or Firm* — Staas & Halsey LLP

(57) ABSTRACT

An optical receiver includes a demultiplexer configured to demultiplex, for each channel, optical signals input through a plurality of channels, a photoelectric converter having a number of light receivers corresponding to the plurality of channels, the photoelectric converter being configured to convert an optical signal into an electric signal for each channel, a monitor circuit configured to monitor, for each channel, an amplitude characteristic of the optical signal converted into the electric signal by the photoelectric converter, and a control circuit configured to control, based on a monitored result of the monitor circuit, a bias voltage to be applied to the light receiver such that an amount of variability in the amplitude characteristic between the channels is minimum or falls within a predetermined range.

13 Claims, 17 Drawing Sheets

(56) References Cited

U.S. PATENT DOCUMENTS

| | | | | |
|---|---|---|---|---|
| 2012/0224868 A1* | 9/2012 | Proesel | .............. | H04B 10/6971 398/208 |
| 2013/0216241 A1* | 8/2013 | Proesel | .................... | G01J 1/46 398/213 |
| 2014/0348500 A1* | 11/2014 | Ishii | .................... | H04B 10/695 398/27 |
| 2015/0318928 A1* | 11/2015 | Yoo | .................... | H04J 14/0282 398/25 |
| 2015/0349911 A1* | 12/2015 | Otsubo | ................ | H04L 1/0046 398/79 |
| 2018/0006756 A1* | 1/2018 | Ishii | .................... | H04J 14/0221 |

* cited by examiner

FIG.9

| ADDRESS | STORED VALUE |
|---|---|
| 0000 | SETTING OF INITIAL APD APPLICATION POWER SOURCE VOLTAGE CORRESPONDING TO TEMPERATURE (T0) FOR x_ch |
| 0001 | SETTING OF INITIAL APD APPLICATION POWER SOURCE VOLTAGE CORRESPONDING TO TEMPERATURE (T1) FOR x_ch |
| ... | ... |
| 000X | SETTING OF INITIAL APD APPLICATION POWER SOURCE VOLTAGE CORRESPONDING TO TEMPERATURE (T) FOR x_ch |
| ... | ... |
| 0010 | LIMIT VALUE OF RATIO BETWEEN MINIMUM CURRENT MONITOR VALUE AND CURRENT MONITOR VALUE FOR EACH CHANNEL |
| 0011 | RESET CHANGE AMOUNT OF BIAS VOLTAGE FOR APD APPLICATION |

| ADDRESS | STORED VALUE |
|---|---|
| 0000 | SETTING OF INITIAL APD APPLICATION POWER SOURCE VOLTAGE CORRESPONDING TO TEMPERATURE (T0) FOR x_ch |
| 0001 | SETTING OF INITIAL APD APPLICATION POWER SOURCE VOLTAGE CORRESPONDING TO TEMPERATURE (T1) FOR x_ch |
| ... | ... |
| 000X | SETTING OF INITIAL APD APPLICATION POWER SOURCE VOLTAGE CORRESPONDING TO TEMPERATURE (T) FOR x_ch |
| ... | ... |
| 0010 | LIMIT VALUE OF RATIO BETWEEN MINIMUM AMPLITUDE MONITOR VALUE AND AMPLITUDE MONITOR VALUE FOR EACH CHANNEL |
| 0011 | RESET CHANGE AMOUNT OF BIAS VOLTAGE FOR APD APPLICATION |

OPTICAL RECEIVER, OPTICAL TRANSCEIVER, AND OPTICAL SIGNAL RECEPTION CONTROL METHOD

CROSS-REFERENCE TO RELATED APPLICATION

This patent application is based upon, and claims the benefit of priority of Japanese Patent Application No. 2016-131939 filed on Jul. 1, 2016, the entire contents of which are incorporated herein by reference.

FIELD

The embodiments discussed herein relate to an optical receiver, an optical transceiver using the optical receiver, and an optical signal reception control method.

BACKGROUND

In high-speed optical communication such as 100 Gigabit Ethernet (registered trademark), standardized optical modules such as CFPx and QSFP 28 are adopted by client side terminals. In order to achieve desired transmission speeds, these optical modules adopt a transmission scheme using amplitude modulation (AM) with 25 Gbps×4 channels (4 wavelengths). In the receiver optical subassembly (ROSA) used for photoelectric conversion and amplification at the receiver's side, four channels are integrated in one package for downscaling.

In the ER4 standard for up to 40 km transmission, among the standard optical modules, a semiconductor optical amplifier (SOA) and a variable optical attenuator (VOA) are used in order to secure a dynamic range for the optical reception power from optical power loss. At the time of receiving low power signals, the received low power signals are collectively amplified by the SOA; at the time of receiving high power signals, the received high power signals are collectively attenuated by the VOA, are demultiplexed to each channel, and are then received by a PIN photodiode (PD).

However, for an objective of downscaling CFP 4 and QSFP 28, the SOA and VOA may be difficult to be disposed due to constraints of mounting sizes. Accordingly, a light receiving scheme using an avalanche photodiode (APD) is being adopted. APD amplifies photocurrent by application of reverse bias (voltage) to achieve high photosensitivity.

RELATED-ART DOCUMENTS

Patent Documents

Patent Document 1: U.S. Patent Application Publication No. 2012/0155864
Patent Document 2: U.S. Patent Application Publication No. 2006/0016894

SUMMARY

According to an aspect of an embodiment, an optical receiver includes a demultiplexer configured to demultiplex, for each channel, optical signals input through a plurality of channels; a photoelectric converter having a number of light receivers corresponding to the plurality of channels, the photoelectric converter being configured to convert an optical signal into an electric signal for each channel; a monitor circuit configured to monitor, for each channel, an amplitude characteristic of the optical signal converted into the electric signal by the photoelectric converter; and a control circuit configured to control, based on a monitored result of the monitor circuit, a bias voltage to be applied to the light receiver such that an amount of variability in the amplitude characteristic between the channels is minimum or falls within a predetermined range.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

BRIEF DESCRIPTION OF THE DRAWINGS

FIG. 9 is a diagram depicting an example of information stored in a memory in the first embodiment;
FIG. 12 is a diagram depicting an example of information stored in a memory in the second embodiment.

DESCRIPTION OF EMBODIMENTS

In a case where multichannels are integrated in one package, the effect of deteriorating reception sensitivity due to crosstalk between the reception channels needs to be considered. In the related art technology, crosstalk has been prevented by disposing one ROSA for each channel, or by arranging walls for radio wave shielding between channels. However, achieving downscaling of ROSA, the mounting area becomes limited, making it difficult to use the related art technology.

In consideration of the above, the following embodiments may provide a compact optical receiver capable of reducing adverse effect of crosstalk between channels.

Figure 1:
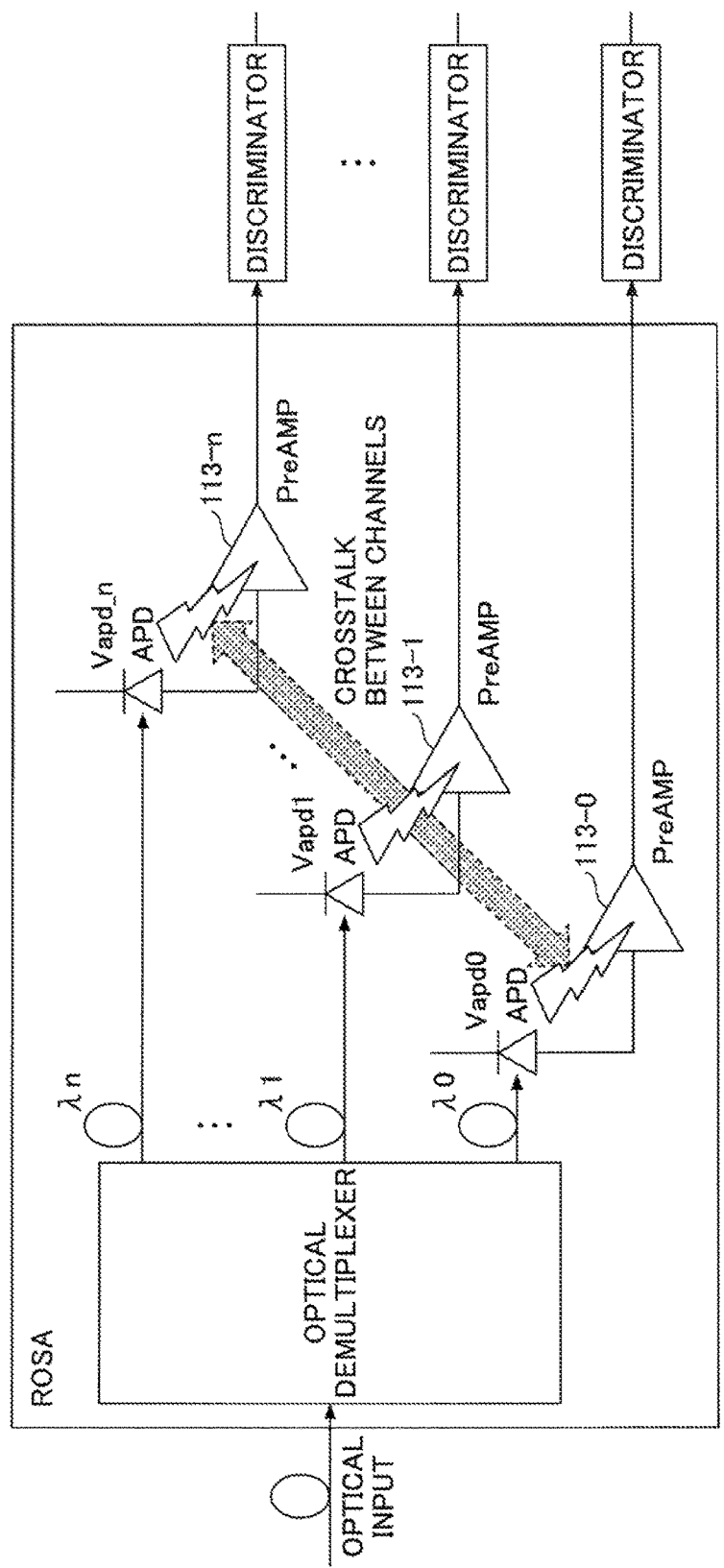
FIG. 1 is a diagram depicting an effect of crosstalk between channels.

Before describing configurations and methods of the embodiments, the adverse effect of crosstalk in an optical reception module (ROSA) will be described with reference to FIGS. 1 to 5. FIG. 1 is a schematic diagram illustrating ROSA applied to an optical receiver of an embodiment. An optical signal input to the ROSA is demultiplexed for each wavelength by an optical demultiplexer and photodetected by a corresponding avalanche photodiode (APD). Bias voltages Vapd_0 to Vapd_n are applied to the respective APDs, and the amplified photocurrent is output. In general, an optimum fixed voltage value is set for each channel. The output of the APD is converted into a voltage signal by preamplifiers 113-1 to 113-$n$ (collectively referred to as "preamplifier 113" as appropriate) to output the converted voltage signal.

When multichannel optical signals are input to the ROSA, crosstalk occurs between the preamplifiers 113. When the optical signal is converted into a photocurrent by the APD and subsequently converted into a voltage signal by the preamplifier 113, the voltage swings with a predetermined amplitude at changing points (i.e., rise and fall) of data. Electromagnetic waves generated by this voltage swing propagate into other channels inside the ROSA, causing interference between the channels, that is, crosstalk. When crosstalk occurs, the accuracy of data identification at a discriminator at a subsequent stage deteriorates, and reception sensitivity decreases.

Figure 2:
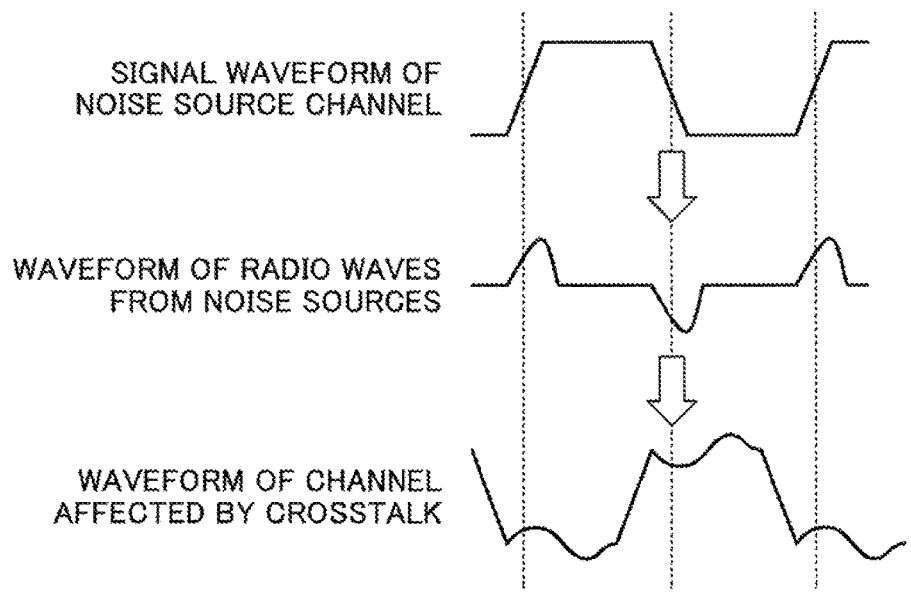
FIG. 2 is a diagram depicting an effect of crosstalk between channels.

FIG. 2 is a diagram illustrating deterioration of a signal waveform due to crosstalk. By the voltage swing of a rising edge and a falling edge of the signal waveform in the channel acting as a noise source, electromagnetic waves of the waveform illustrated in the middle part of FIG. 2 are radiated into the ROSA. Due to the effect of this electromagnetic wave (noise), the signal waveform of the other channels deteriorates as illustrated in the lower part of FIG. 2.

Figure 3:
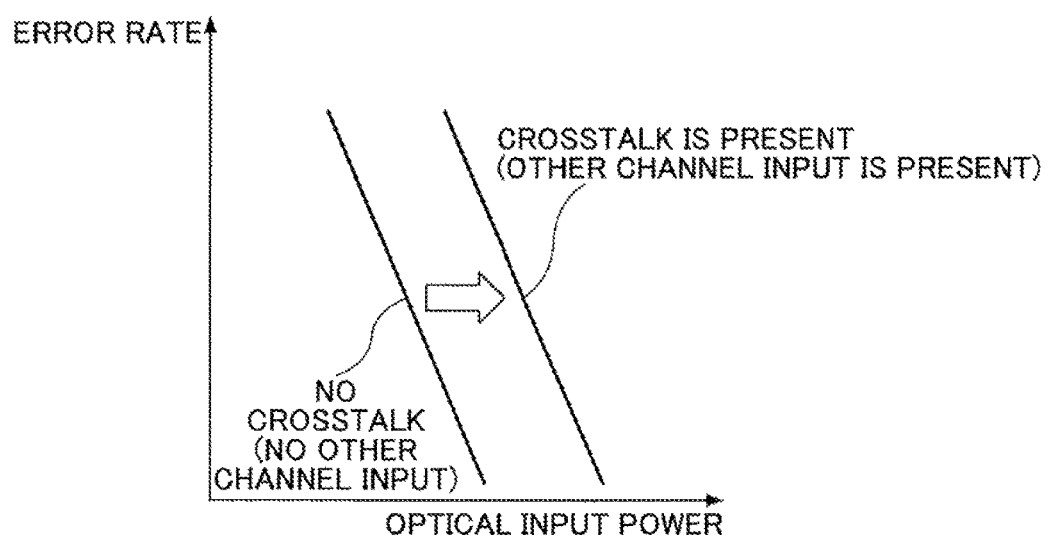
FIG. 3 is a diagram depicting an effect of crosstalk between channels.

FIG. 3 is a diagram illustrating deterioration of reception sensitivity due to crosstalk between channels. The horizontal axis indicates optical input power and the vertical axis indicates an error rate. When the optical input power is the same, the error rate determined by the standard may fail to be maintained due to the effect of crosstalk. In order to maintain an error rate determined by the standard, the optical input power has to be increased. However, the optical input power is determined by transmission loss, and needs to satisfy the input power range determined by the standard.

Figure 4:
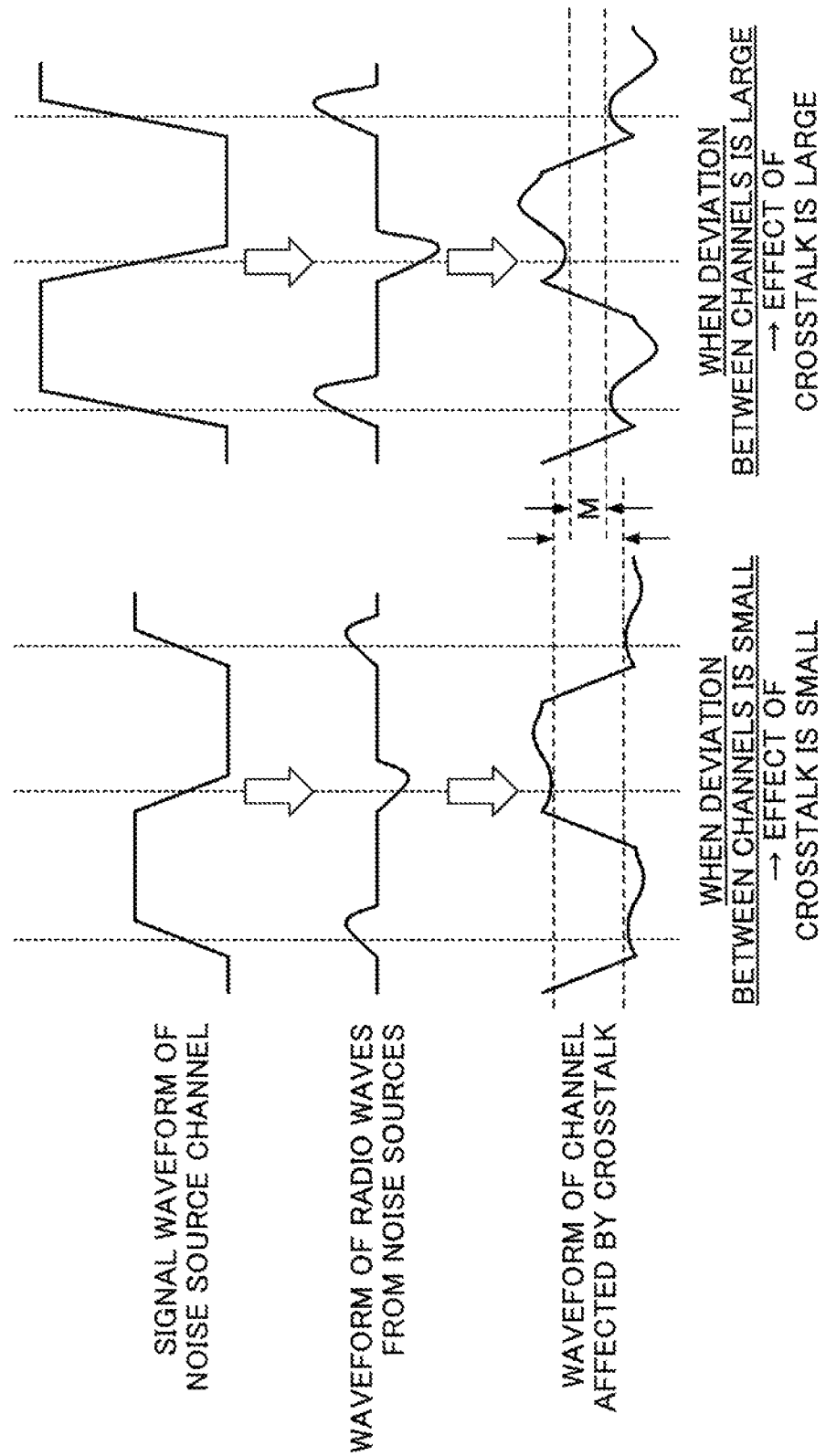
FIG. 4 is a diagram depicting an effect of crosstalk between channels.

FIG. 4 is a diagram illustrating an effect of input power deviation between channels with respect to waveform deterioration due to crosstalk. The left side of FIG. 4 illustrates a case where the deviation between channels is small, and the right side of FIG. 4 illustrates a case where the deviation between the channels is large. The optical input power varies between the channels due to variability in an optical output power between channels at the transmitter side and/or variability in transmission loss between channels. When the deviation between channels is small, the amplitude of the signal of each channel becomes substantially equal. In this case, even when the signal waveform of the other channel deteriorates to some extent by the waveform of the radio wave from the noise source, the waveform deterioration remains within an allowable range, and the effect on the data identification margin due to threshold determination is small.

When the deviation between channels is large, the amplitude varies depending on the channel, and the deterioration of the signal waveform of the other channel is increased due to the effect of noise generated in the channel having a large amplitude. In the APD to which a fixed bias voltage is applied, the deviation of the input power is not compensated and the effect of crosstalk corresponding to the deviation of the input power is directly received. As a result, the identification margin based on the threshold value decreases, increasing the risk of determining an erroneous data value (e.g., "1" and "0"). Noise from one channel may affect all channels in the ROSA.

Figure 5:
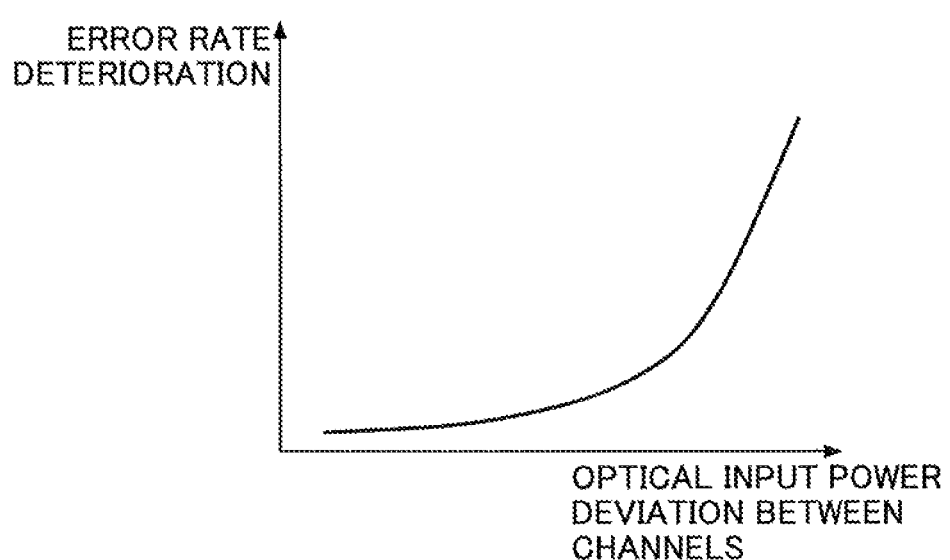
FIG. 5 is a diagram depicting an effect of crosstalk between channels.

FIG. 5 is a diagram illustrating a correlation between channel deviation and error rate deterioration. The horizontal axis represents an optical input power deviation between channels, and the vertical axis represents error rate deterioration. The greater the deviation between channels, the greater the deterioration of error rate. In order to maintain the error rate determined by the standard, it is clear that reducing the deviation between the channels with respect to factors (current amplitude, voltage amplitude, etc.) related to the optical input power may be effective.

In view of the above-described effect and consideration, in the embodiment, the effect of crosstalk is reduced by reducing the deviation between channels in ROSA in which multichannels are integrated.

First Embodiment

Figure 6:
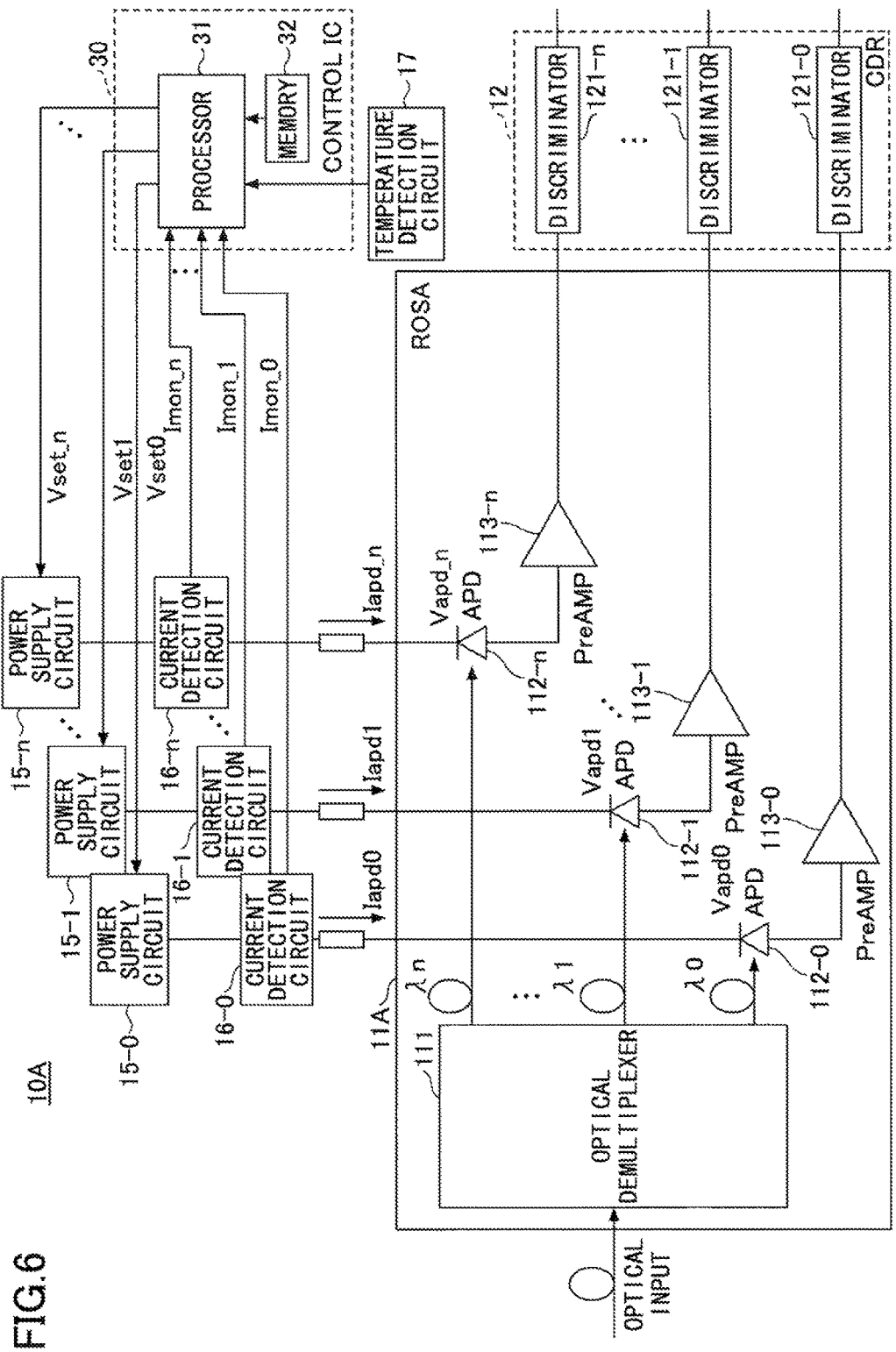
FIG. 6 is a schematic diagram of an optical receiver of a first embodiment.

FIG. 6 is a schematic diagram of an optical receiver 10A of a first embodiment. In the first embodiment, the amplitude difference in photocurrent between channels is maintained within a predetermined range by controlling a voltage applied to an APD, based on a current monitor value of an avalanche photodiode (APD).

The optical receiver 10A includes an optical reception module 11A, power supply circuits 15-0 to 15-$n$ (collectively referred to as "power supply circuit 15" as appropriate), and current detection circuits 16-0 to 16-$n$ acting as monitor circuits. In the optical receiver 10A, a clock data recovery (CDR) 12, a temperature detection circuit 17, and a control integrated circuit (IC) 30 are also used; however, these components may also be used in common with an optical transmitter in an optical transceiver (see FIG. 18).

The optical reception module 11A is also referred to as "ROSA", and includes an optical demultiplexer 111, APDs 112-0 to 112-$n$, and preamplifiers 113-0 to 113-$n$. Photoelectric (O/E) converters are formed with APDs 112-0 to 112-$n$ and preamplifiers 113-0 to 113-$n$.

The optical demultiplexer 111 is configured to separate an input optical signal for each channel and output a demultiplexed signal light. Any input form of the multichannel optical signal and any configuration of the optical demultiplexer 111 may be used. For example, when a wavelength-multiplexed signal light is input into one optical fiber, the signal light is demultiplexed by the optical demultiplexer 111 for each wavelength to output optical signals of wavelengths λ0 to λn. An arrayed waveguide (AWG: Arrayed Waveguide Grating) may be used as the optical demultiplexer, or a combination of a bandpass filter and a mirror that pass only light of a specific wavelength may be used. In addition, in a case where light of different wavelengths is spatially bundled and input for each fiber by a multicore fiber cable, the multicore fiber cable may be separated into individual optical fibers.

Each demultiplexed optical signal is incident on the corresponding APD 112-0 to 112-$n$. In a case of using a multicore fiber cable, for example, the output surfaces of the separated optical fibers may face the corresponding light receiving surfaces of the APDs 112-0 to 112-n. In a case of wavelength division multiplexing, light of each wavelength demultiplexed by the optical demultiplexer 111 may be directly collected by a microlens array from the APD 112-0 to the APD 112-n.

The cathodes of the APDs 112-0 to 112-n are connected to the corresponding power supply circuits 15-0 to 15-n. Based on a control signal from the control IC 30, the power supply circuits 15-0 to 15-n generate positive bias voltages Vapd_0 to Vapd_n to be applied to the cathodes of the APDs 112-0 to 112-n. By adjusting the bias voltages Vapd_0 to Vapd_n, the multiplication factor of the photocurrent generated by the APDs 112-0 to 112-n is made to be variable. Each of the power supply circuits 15-0 to 15-n may be formed of a DC-DC converter, which is configured to convert a voltage supplied from a power supply IC commonly used with an optical transmitter to a desired voltage, and a resistor, for example.

The anodes of the APDs 112-0 to 112-n are connected to the preamplifiers 113-0 to 113-n, the generated photocurrents are converted into voltages by the preamplifiers 113-0 to 113-n, the converted voltages are amplified to a level suitable for being input to the discriminators 121-0 to 121-n, and the amplified signals are then output. Outputs of the preamplifiers 113-0 to 113-n act as outputs of ROSA, and electric signals are input to the CDR 12. The electric signals of the respective channels undergo data value determination in the discriminators 121-0 to 121-n of the CDR 12 based on a threshold value, timing extraction and waveform shaping.

In the first embodiment, current detection circuits 16-0 to 16-n are disposed between power supply circuits 15-0 to 15-n and APDs 112-0 to 112-n. Current detection circuits 16-0 to 16-n detect photocurrents Iapd_0 to Iapd_n flowing through APDs 112-0 to 112-n and output current monitor values Imon_0 to Imon_n. The current monitor values Imon_0 to Imon_n of the respective channels are input to the processor 31 in the control IC 30. In FIG. 6, the current detection circuits 16-0 to 16-n are disposed outside the optical reception module 11A; however, the current detection circuits 16-0 to 16-n may each be formed with a known current detection circuit such as a current mirror circuit and may be disposed within the optical reception module 11A.

The processor 31 generates control signals Vset_0 to Vset_n based on the current monitor values Imon_0 to Imon_n such that the amplitude difference between the photocurrents flowing through the APDs 112-0 to 112-n becomes minimum or within a predetermined range between the channels, and outputs the generated control signals Vset_0 to Vset_n to the power supply circuits 15-0 to 15-n. The power supply circuits 15-0 to 15-n adjust the bias voltages Vapd_0 to Vapd_n to be applied to the APDs 112-0 to 112-n based on the control signal from the processor 31.

The memory 32 in the control IC 30 may store a limit value for restricting the amplitude difference in the photocurrent flowing in the APDs 112-0 to 112-n between the channels so as to fall within a predetermined range. Further, since the photocurrent multiplication factor of the APDs 112-0 to 112-n has temperature dependence, the memory 32 stores initial bias values applied to the APDs 112-0 to 112-n in association with temperatures. As an initial bias value, for example, a voltage value at which the highest signal-to-noise (S/N) ratio is obtained is selected for each temperature. The temperature detected by the temperature detection circuit 17 may be monitored by the processor 31, and the processor 31 may refer to the memory 32 to perform voltage control according to the temperature.

Figure 7:
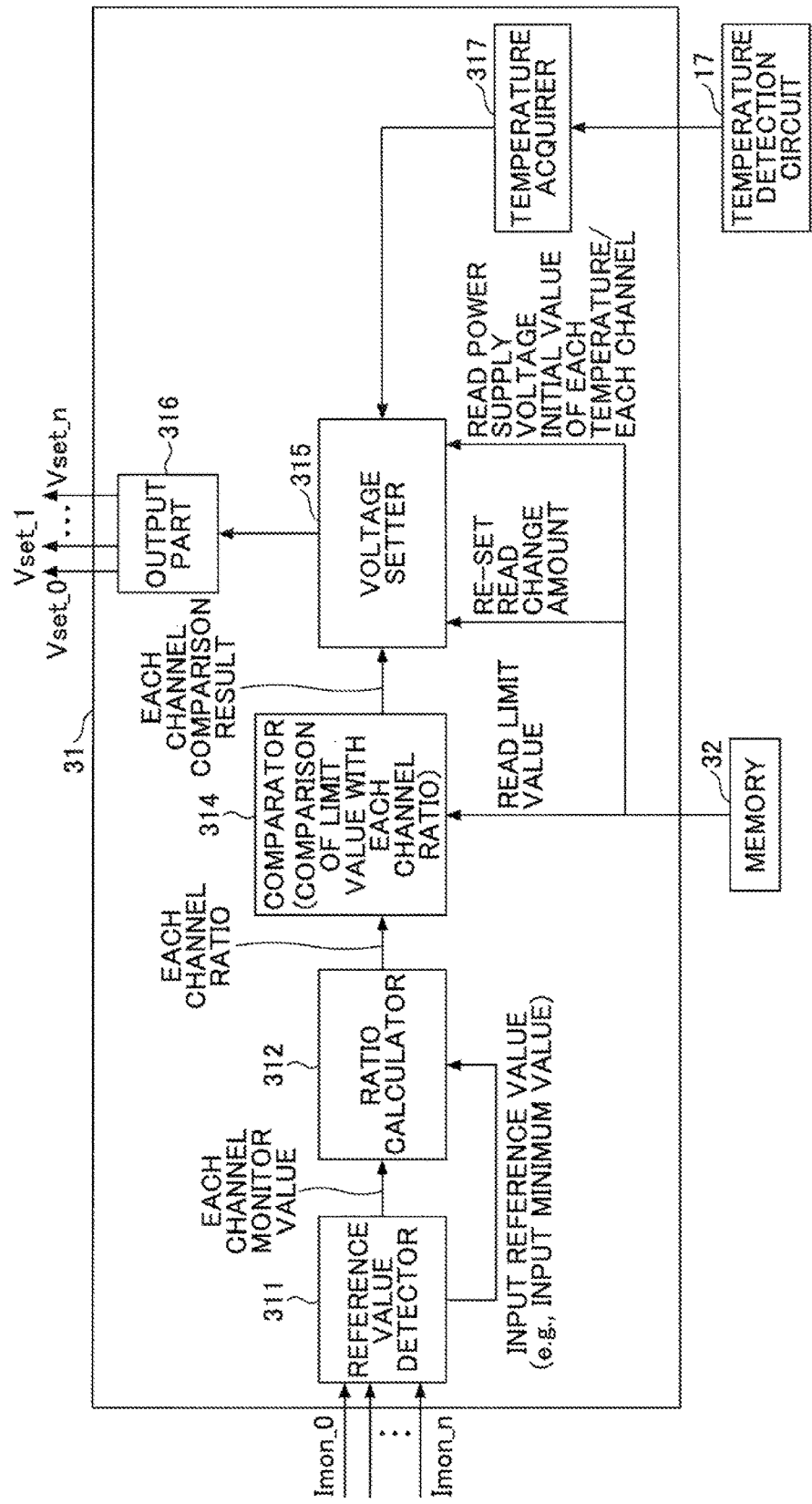
FIG. 7 is a functional block diagram of a processor.

FIG. 7 is a functional block diagram of the processor 31. The processor 31 includes a reference value detector 311, a ratio calculator 312, a comparator 314, a voltage setter 315, an output part 316, and a temperature acquirer 317.

The reference value detector 311 is configured to receive current monitor values Imon_0 to Imon_n detected by the current detection circuits 16-0 to 16-n, and to determine one reference value among multiple current monitor values. Any value such as a minimum value, a maximum value, a median value, or a mean value may be used as a reference value. In this example, the minimum current monitor value is used as the reference value.

The reference value detector 311 outputs the current monitor values Imon_0 to Imon_n of each channel and the reference value (e.g., the minimum value) to the ratio calculator 312. The ratio calculator 312 is configured to calculate a ratio of the current monitor value to the minimum value for each channel. The calculated value of the ratio for each channel is input to the comparator 314.

The comparator 314 is configured to read a limit value from the memory 32 and to compare the limit value with the ratio for each channel. The comparison results are input to the voltage setter 315. The voltage setter 315 is configured to set bias voltages to be applied to the APDs 112-0 to 112-n based on the comparison results. In a case of changing (resetting) the bias voltage, the voltage setter 315 reads, from the memory 32, a reset change amount used for adjustment of the bias voltage, changes the bias voltage value by reset change amount, and sets a new voltage.

The temperature acquirer 317 is configured to acquire the temperature detected by the temperature detection circuit 17 and to supply temperature information to the voltage setter 315. When setting the initial voltages to the power supply circuits 15-0 to 15-n (e.g., with the power of the optical receiver 10A being turned on or the like), the voltage setter 315 refers to the memory 32 to determine power supply voltages corresponding to the acquired temperatures for respective channels.

The voltage values set by the voltage setter 315 are output from the output part 316 to the power supply circuits 15-0 to 15-n as control signals Vset_0 to Vset_n indicating voltage setting values. The reverse bias voltages are adjusted by the control signals Vset_0 to Vset_n such that the amplitude difference in the photocurrent flowing through the APDs 112-0 to 112-n between the channels constantly falls within a the limit value range. As a result, the deviation between channels may be reduced and the effect of crosstalk may be reduced.

Figure 8:
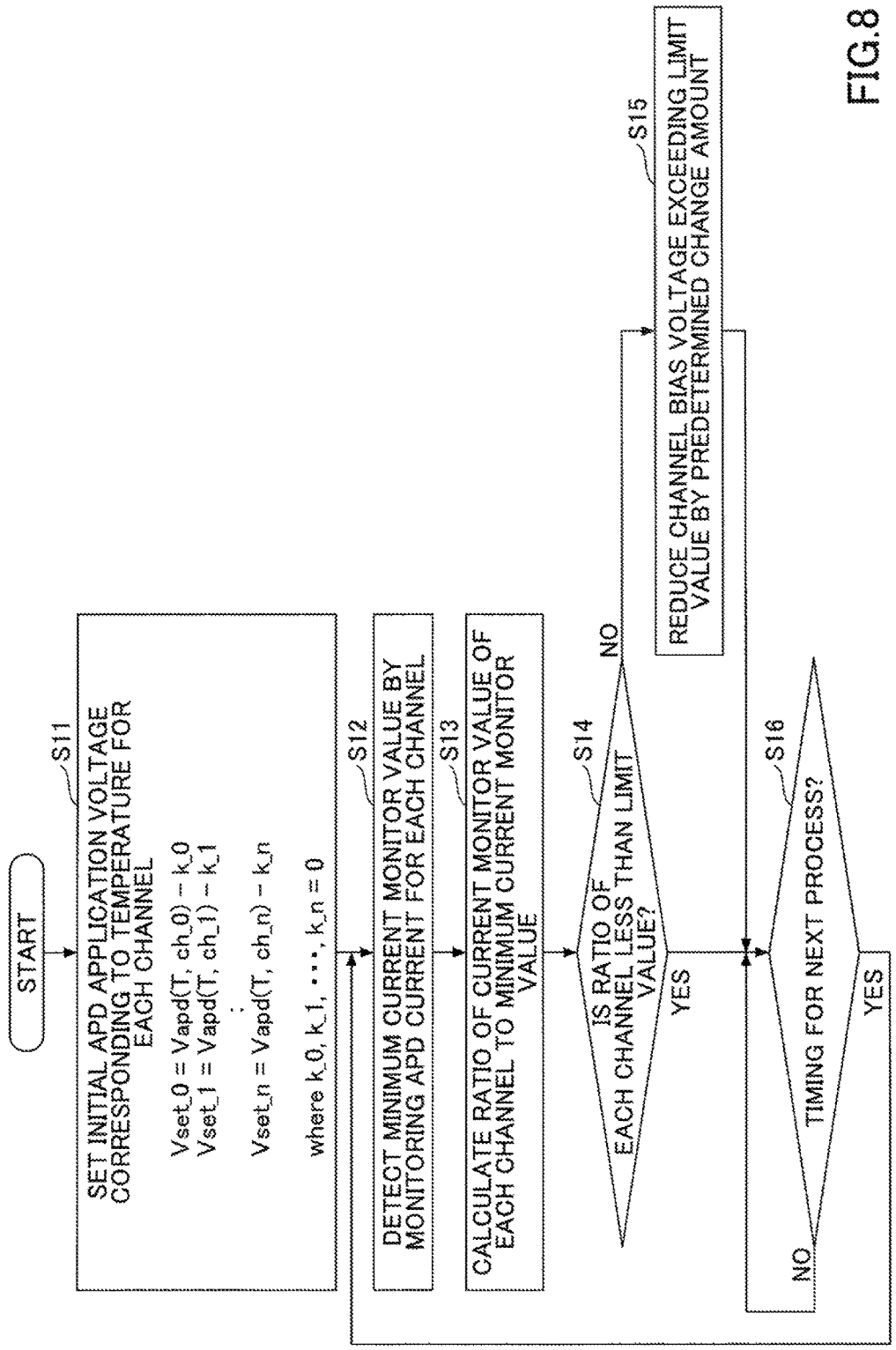
FIG. 8 is a diagram of a control flow of the first embodiment.

FIG. 8 is a flowchart of voltage control performed by the optical receiver 10A of the first embodiment. This process is performed by the processor 31 of the control IC 30. First, initial voltage values to be applied to the APDs 112-0 to 112-n are set corresponding to the temperatures for respective channels (step S11). For example, for channel 0, Vset_0 is a voltage value set in the power supply circuit 15-0, Vadp (T, ch 0) is a reverse bias applied to the APD 112-0 in channel 0 at temperature T, k is a voltage adjustment amount for each channel determined based on the reset change amount and the number of loops (loop count). In a case of an initial setting, the voltage adjustment amount k is zero (k=0) in all channels. The initial set values corresponding to the temperatures in the power supply circuits 15-0 to 15-n are recorded in the memory 32.

During the operation of the optical receiver 10A, the monitored values of the photocurrents flowing through the APDs 112-0 to 112-*n* are acquired by the processor 31, and a minimum current monitor value may be determined as a reference value (step S12), for example. The processor 31 is configured, for each channel, to calculate a ratio of the current monitor value to the minimum value (step S13) and to determine whether the value of the ratio is less than or equal to the limit value stored in the memory 32 (step S14). The value of the ratio is 1 in the reference channel; for channels other than the reference channel, the value of the ratio is greater than 1. As the limit value, for example, a value such as "1.2" may be set.

When the ratio value is less than the limit value in all the channels (YES in step S14), the variability in the current amplitude between the channels is considered to fall within the allowable range and the optical receiver 10A is in a standby mode until the next loop starts (step S16), and the voltage control process returns to step S12. When there is a channel whose ratio value exceeds the limit value (NO in step S14), the voltage value of the power supply circuit 15 is changed by a predetermined change amount (e.g., a step size of the reset change amount stored in the memory 32) to decrease the deviation from the minimum value channel (step S15). As a result of the process of step S15, the voltage adjustment amount k of the channel having the deviation exceeding the limit value is not zero (k≠0). Thereafter, the voltage control process is in a standby mode until the next loop starts in step S16, and repeats the processes from step S12 at the next process timing (YES in step S16).

The process of FIG. 8 is repeatedly performed during operation of the optical receiver 10A. In a channel with a difference from the reference channel being stably within the limit value range, the voltage adjustment amount k may still be maintained at zero (k=0) after the loop is repeated. Conversely, in a channel with a large deviation from the reference channel, the value of the voltage adjustment amount k changes until the deviation converges within the allowable range.

With this control, the deviation of the amplitude characteristic between the multiple channels is controlled so as to constantly fall within a predetermined range at a stage of photoelectric conversion, and the effect of crosstalk may be reduced.

FIG. 9 depicts an example of data stored in the memory 32. For each address, an initial APD application bias value for a corresponding one of channels with respect to various temperatures T is recorded. The temperature interval may be constant, alternatively, the temperature interval may be small at the low temperature side and widened at the high temperature side. For example, an allowable deviation from the reference value of the current monitor value detected in each channel with respect to the reference channel (e.g., the channel having the minimum current monitor value) is recorded in the memory 32. An example of such allowable deviation includes the limit value of the ratio of the monitor value to the reference value for each channel. Further, a reset change amount for adjusting the reverse bias applied to the APD 112 is recorded in the memory 32. The processor 31 appropriately reads the values stored in the memory 32 and adjusts the voltage values set in the power supply circuits 15-0 to 15-*n* to control such that the deviation between the channels falls within a predetermined range.

Modification of First Embodiment

The configuration and method of the first embodiment are not limited to the examples described above. As the reference channel among the multiple channels, a channel in which the maximum photocurrent flows may be selected instead of the channel with the minimum current value. When priority is given to reducing the amount of noise with respect to other channels, the S/N ratio is optimized by setting the channel with the smallest current monitor value to the reference channel and matching the voltage values of the other channels to the photocurrent multiplication factor of the reference channel. However, for accurate data detection it is desirable to have an input power that is greater than a certain level. Hence, control to optimize the S/N ratio by matching the photocurrent amounts of multiple channels to the maximum current monitor value is also effective for reducing the effect of crosstalk. In this case, for example, the ratio of the current monitor value of the reference channel to the current monitor value of each channel may be calculated to perform control of raising the bias voltage of each channel such that the ratio is equal to or less than the limit value.

Further, a difference between the reference channel and the other channel may be obtained instead of calculating the ratio between the reference channel and the other channels. When the channel having the minimum current monitor value is used as the reference channel, the limit value is expressed by the current amount. The voltage setter 315 decreases the voltage value of the power supply circuit 15 of the corresponding channel such that the difference from the reference channel is equal to or less than the limit value.

Alternatively, voltage control may be performed based on the difference between the current monitor values whereby the channel having the maximum current monitor value is the reference channel. The voltage setter 315 raises the voltage value of the power supply circuit 15 of the corresponding channel such that the difference from the reference channel is equal to or less than the limit value.

Furthermore, instead of controlling the ratio or difference to be equal to or less than the limit value, control to minimize the deviation between the channels, specifically, control to make the ratio close to 1, or control to make the difference closer to 0 may be performed. In this case, for example, using the mean value or the median value as a reference value, the direction of control in step S15 is changed depending on whether the ratio is greater than or less than 1 in step S14, or on whether the difference is greater than or less than 0. In this control, it is not necessary to use the limit value, and deviation between channels may be more precisely reduced.

Further, the reset change amount of the bias voltage applied to the APD may be stored in the memory 32 in association with the temperature. When different reset change amounts are used for different temperatures, the speed at which the deviation between the channels converges within the predetermined range becomes faster. This process will be described in more detail later in a third embodiment. As illustrated in FIG. 9, when one reset change amount is used, for example, the reset change amount at the lowest temperature is determined in advance in a use environment of the optical receiver 10A. As the temperature rises, the lattice vibration of the crystal increases, and the accelerated carriers collide within the crystal before the accelerated carrier energy reaches a sufficiently high level, resulting in a decreasing change in the multiplication factor. Accordingly, control is performed by using the reset change amount at the low temperature side where a slope of the change in the multiplication factor is large.

Alternatively, two or more of the above-described modifications may be combined. Accordingly, the effect of crosstalk may be reduced more efficiently.

Second Embodiment

Figure 10:
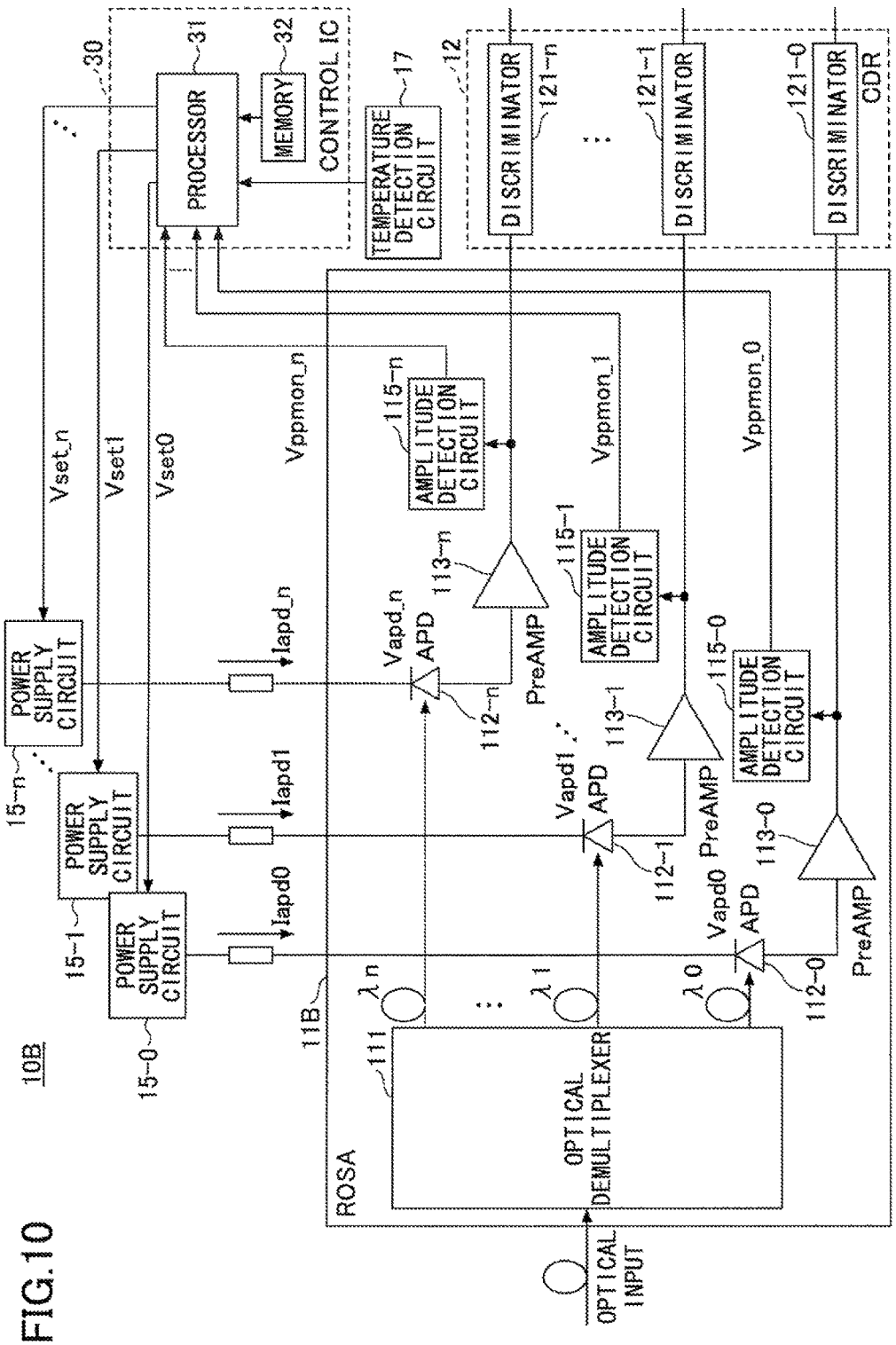
FIG. 10 is a schematic diagram of an optical receiver of a second embodiment.

FIG. 10 is a schematic diagram of an optical receiver 10B of a second embodiment. In the second embodiment, the amplitudes of the voltage signals output from the preamplifiers 113-0 to 113-n are monitored instead of monitoring the photocurrent flowing in the APD, and voltage control is performed based on the monitored results.

The optical receiver 10B includes an optical reception module 11B, power supply circuits 15-0 to 15-n, and amplitude detection circuits 115-0 to 115-n as monitor circuits. In the optical receiver 10B, a clock data recovery (CDR) 12, a temperature detection circuit 17, and a control integrated circuit (IC) 30 are also used; however, these components may be used in common with an optical transmitter in an optical transceiver.

Similar to the first embodiment, in the optical reception module 11B, multichannel input optical signals are demultiplexed into respective channels by the optical demultiplexer 111 and the demultiplexed optical signals are photodetected by the APDs 112-0 to 112-n. The cathodes of the APDs 112-0 to 112-n are connected to the corresponding power supply circuits 15-0 to 15-n, and a reverse bias is applied to the APDs 112-0 to 112-n. The photocurrent generated by the incidence of light to the APDs 112-0 to 112-n is multiplied by the application of the reverse bias. The anodes of the APDs 112-0 to 112-n are connected to the preamplifiers 113-0 to 113-n, and the generated photocurrents are converted into voltage signals by the preamplifiers 113-0 to 113-n. The electrical signals output from the preamplifiers 113-0 to 113-n undergo waveform shaping by the discriminators 121-0 to 121-n of the CDR 12 to perform data determination.

In the second embodiment, the outputs of the preamplifiers 113-0 to 113-n are branched, and the voltage amplitudes are monitored by the amplitude detection circuits 115-0 to 115-n. The voltage amplitude value of respective channels correlate with the amplitudes of the photocurrent flowing through the APDs 112-0 to 112-n. As the amplitude detection circuits 115-0 to 115-n, any configurations such as a peak detector circuit and a peak hold circuit may be adopted.

The amplitude values Vppmon_0 to Vppmon_n of the voltage signals of the respective channels detected by the amplitude detection circuits 115-0 to 115-n are input to the processor 31 in the control IC 30. Based on the amplitude monitor values Vppmon_0 to Vppmon_n, the processor 31 generates the control signals Vset_0 to Vset_n such that the voltage amplitude difference between the channels becomes minimum or falls within a predetermined range. The control signals are input to the power supply circuits 15-0 to 15-n. The power supply circuits 15-0 to 15-n adjust the bias voltages Vapd_0 to Vapd_n to be applied to the APDs 112-0 to 112-n based on the control signals from the processor 31. The multiplication factor of the photocurrent generated by the APDs 112-0 to 112-n is made to be variable by adjusting the bias voltages Vapd_0 to Vapd_n, thereby reducing the amplitude variability between channels.

The memory 32 in the control IC 30 stores a limit value for limiting the deviation or the variability in the voltage amplitudes detected by the amplitude detection circuits 115-1 to 115-n between the channels to fall within a predetermined range. The processor 31 refers to the memory 32 as appropriate to perform voltage control. The functional block of the processor 31 is the same as that of the first embodiment, as described with reference to FIG. 7.

Figure 11:
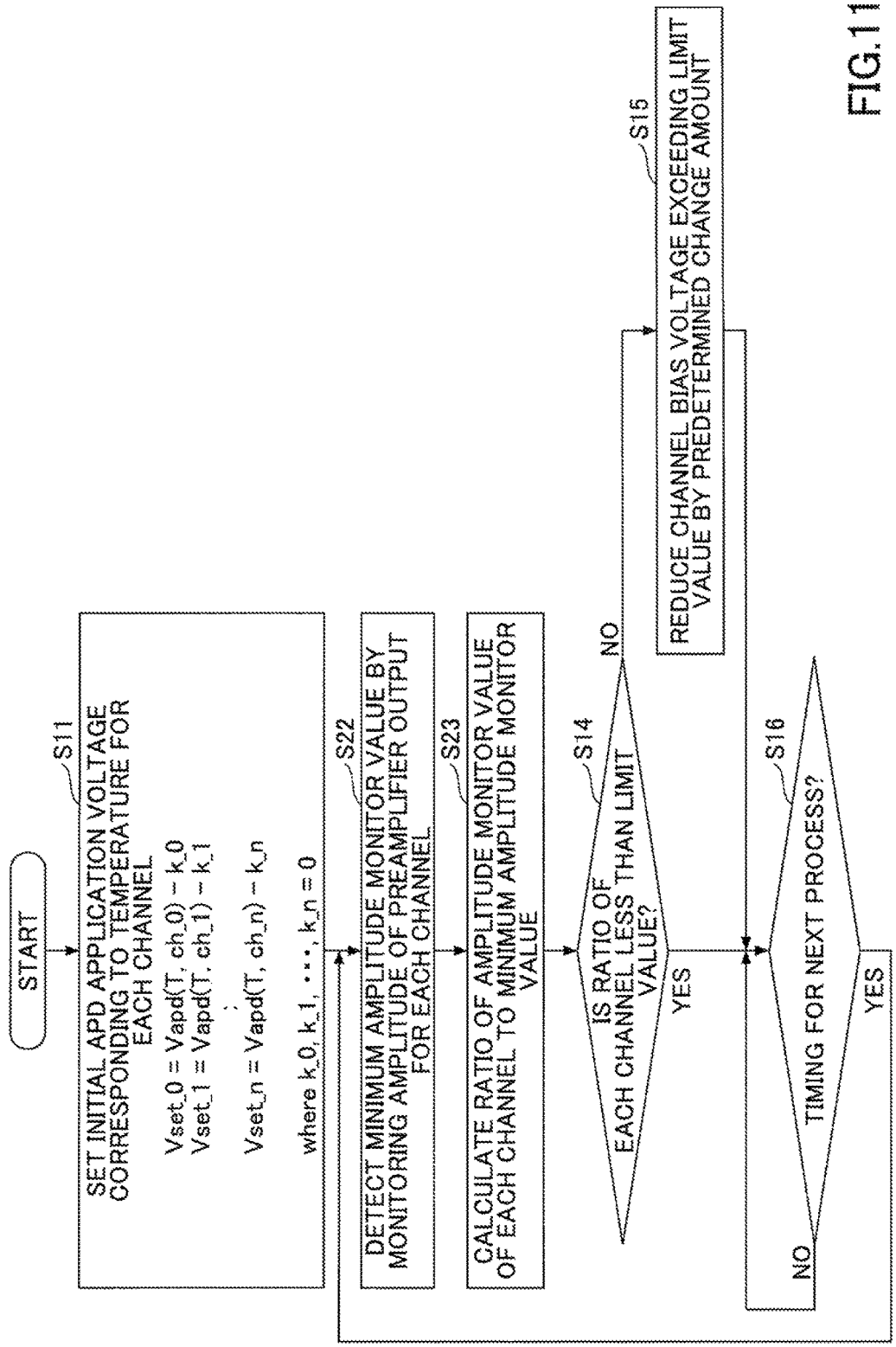
FIG. 11 is a diagram of a control flow of the second embodiment.

FIG. 11 is a flowchart of voltage control performed in the optical receiver 10B. This process is performed by the processor 31 of the control IC 30. The same steps as those of the first embodiment are denoted by the same reference numerals, and the description of these steps is simplified.

First, referring to the detection value of the temperature detection circuit 17 and the memory 32, the initial voltage values to be applied to the APDs 112-0 to 112-n are set according to the temperatures (step S11). In an initial setting, the voltage adjustment amount k is zero (k=0) in all channels. The initial set values corresponding to the temperatures in the power supply circuits 15-0 to 15-n are recorded in the memory 32.

During the operation of the optical receiver 10A, the amplitudes of the voltage signals output from the preamplifiers 113-0 to 113-n are obtained by inputs from the amplitude detection circuits 115-0 to 115-n, and a minimum amplitude monitor value is determined as a reference value, for example (step S22). The processor 31 calculates a ratio between the amplitude monitor value and the minimum value monitored for each channel (step S23) and determines whether the value of the ratio is less than or equal to the limit value stored in the memory 32 (step S14).

When the ratio value is less than the limit value in all the channels (YES in step S14), the deviation between the channels is considered to fall within the allowable range and the optical receiver 10A is in a standby mode until the next loop starts (step S16), and the voltage control process returns to step S22. When there is a channel whose ratio value exceeds the limit value (NO in step S14), the voltage value of the power supply circuit 15 is changed by a predetermined change amount (e.g., a step size of the reset change amount stored in the memory 32) to decrease the deviation from the minimum value channel (step S15). Thereafter, the process is in a standby mode until a next timing in step S16 and returns to step S22. As a result of the process of step S15, the voltage adjustment amount k of the channel having the deviation exceeding the limit value is not zero (k≠0).

The process of FIG. 11 is repeatedly performed during operation of the optical receiver 10A. In a channel in which the deviation from the reference channel is stably within the limit value range, the voltage adjustment amount k may still be maintained at zero (k=0) after the loop is repeated. Conversely, in a channel with a large deviation from the reference channel, the value of the voltage adjustment amount k changes until the deviation converges within the allowable range.

With this control, the variability of the amplitude characteristic between the multiple channels is controlled so as to constantly fall within a predetermined range at a stage of photoelectric conversion, and the effect of crosstalk may be reduced.

FIG. 12 depicts an example of data stored in the memory 32. For each address, an initial APD application bias value for a corresponding one of channels with respect to various temperatures T is recorded, as similar to the first embodiment. In addition, a reference channel (e.g., a channel having a monitor value of minimum voltage amplitude) and a limit value of deviation of each channel are recorded. Further, a reset change amount for adjusting the reverse bias applied to the APD 112 is recorded in the memory 32. The processor 31 appropriately reads the values stored in the memory 32 and adjusts the voltage values set in the power supply circuits 15-0 to 15-n to control such that the deviation between the channels falls within a predetermined range.

Third Embodiment

Figure 13:
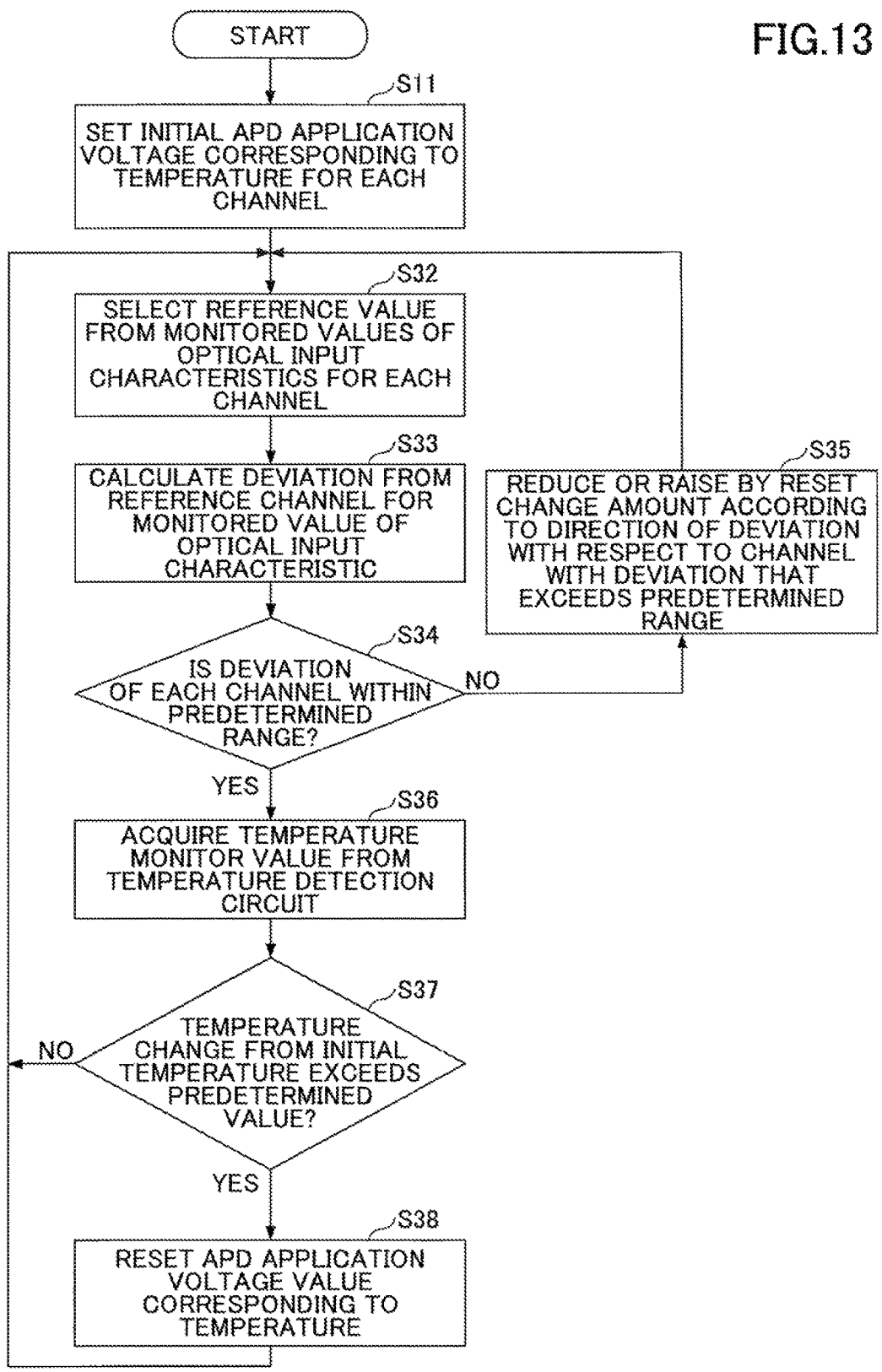
FIG. 13 is a diagram of a control flow of a third embodiment.

FIG. 13 depicts a flowchart of voltage control of a third embodiment.

Since a multiplication factor of the photocurrent of the APDs 112-0 to 112-n has temperature dependency, control corresponding to a temperature change may be incorporated in bias control that reduces the effect of crosstalk.

Figure 14B:
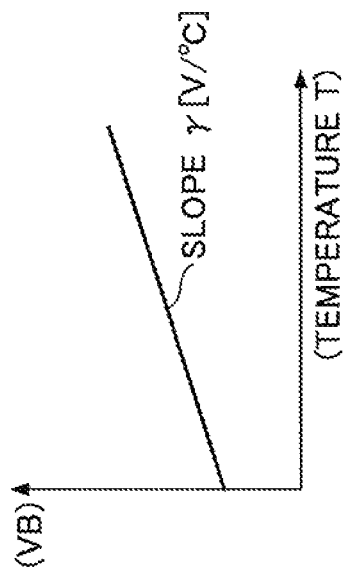
FIGS. 14A and 14B are diagrams depicting a photocurrent and a bias voltage corresponding to temperature change.
Figure 14A:
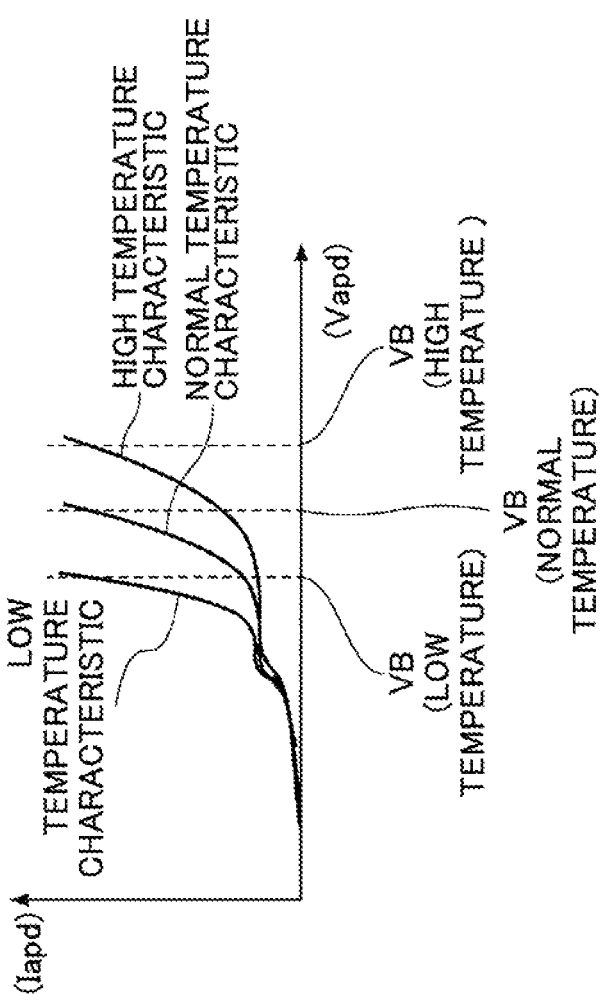

FIGS. 14A and 14B are graphs illustrating temperature dependency of a photocurrent multiplication factor of the APD. FIG. 14A is a diagram illustrating a relationship between APD bias voltage (Vapd) and photocurrent (Iapd) at different temperatures, and FIG. 14B a diagram illustrating a relationship between temperature (T) and bias voltage (VB). As illustrated in FIG. 14A, a slope of a photocurrent change with respect to the applied bias voltage is greater at a low temperature side. As described in the first embodiment, by using one reset change amount, which is adjusted in advance to the low temperature side, the optimum multiplication factor may also be achieved, while repeating the loop at the high temperature side. However, when the temperature change is large, the speed and accuracy of control may be improved by resetting the bias voltage of the entire power supply circuit 15 to the optimum value corresponding to the temperature. Hence, in FIG. 13, control is performed by incorporating temperature information.

The process of FIG. 13 is performed by the processor 31 of the control IC 30, which may be applied to the optical receiver 10A of the first embodiment and the optical receiver 10B of the second embodiment. The same steps as those of the first embodiment and the second embodiment are denoted by the same reference numerals, and the description of these steps is simplified.

First, referring to the detection value of the temperature detection circuit 17 and the memory 32, the initial voltage values to be applied to the APDs 112-0 to 112-n are set according to the temperatures (step S11). In an initial setting, the voltage adjustment amount k is zero (k=0) in all channels.

During the operation of the optical receiver 10A or 10B, the processor 31 acquires the monitored value of the amplitude characteristic in the photoelectric conversion from the monitor circuits such as the current detection circuit 16, the amplitude detection circuit 115 and the like, and determines the reference value among the monitor values (step S32). Any value such as a minimum value, a maximum value, a mean value, or a median value may be used as a reference value.

The processor 31 calculates a deviation from the reference value of the monitor value monitored in each channel (step S33). Any value representing a degree of departure from the reference value, such as the ratio to the reference value, the difference from the reference value, may be used as a deviation. Further, the processor 31 determines whether the deviation of each channel falls within a predetermined range (step S34).

When there is a channel whose deviation exceeds a predetermined range (NO in step S34), the voltage value of the power supply circuit 15 of the channel is decreased or increased by the step size of the reset setting change amount according to the direction of the deviation so as to reduce the deviation from the reference channel (step S35). Thereafter, the processor 31 returns to step S32 and repeats the processes from step S32 at the next process timing.

When the deviation falls within the predetermined range for all the channels (YES in step S34), the processor 31 acquires the temperature monitor value from the temperature detection circuit 17 (step S36), and determines whether the amount of a temperature change (absolute value) from the initial temperature exceeds a predetermined value (step S37). When the temperature change is within the predetermined range (NO in step S37), the processor 31 returns to step S32, and repeats the processes from step S32 at the next process timing.

When the amount of temperature change from the initial temperature exceeds the predetermined value (YES in S37), the APD application bias voltage values corresponding to the temperatures for all the channels are read from the memory 32 and the voltage values of the power supply circuits 15 are reset (step S38). Thereafter, the processor 31 returns to step S32 and repeats the processes from step S32 at the next process timing.

The process of FIG. 13 is repeatedly performed during operation of the optical receiver 10A or the optical receiver 10B. Through this process, even when a temperature change occurs, the deviation between the channels may be quickly converged within a predetermined range. Even in an environment with a large temperature change, the reverse bias applied to the APDs 112-0 to 112-n is efficiently adjusted in a direction of reducing the deviation between the channels, which may reduce the effect of crosstalk.

Figure 15:
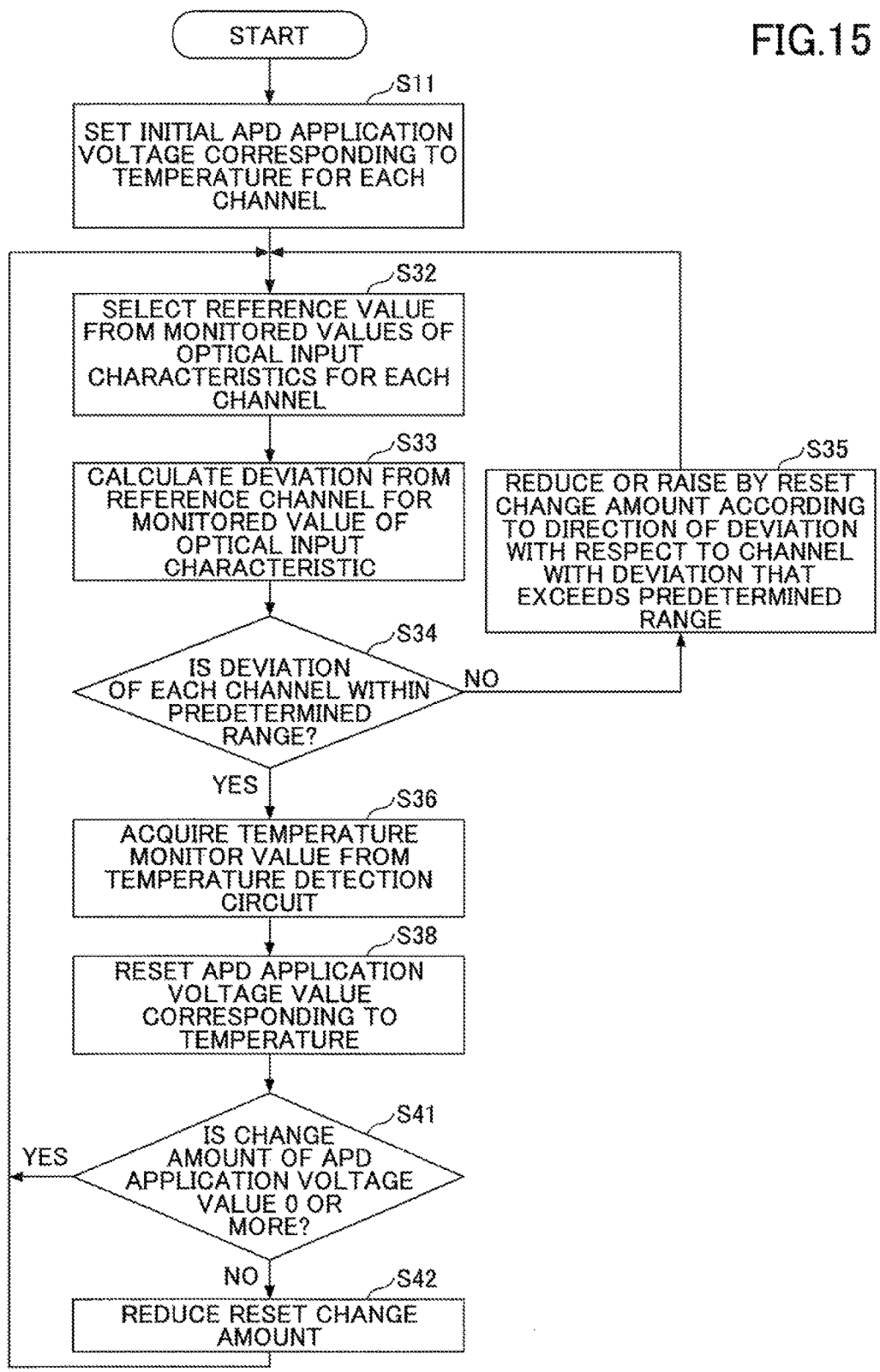
FIG. 15 is a flowchart of a modification of the third embodiment.

FIG. 15 is a flowchart of a modification of the third embodiment. In the modification, the reset voltage change amount of the bias voltage is changed corresponding to the temperature. As illustrated in FIG. 14A, the photocurrent multiplication factor of APD has temperature dependency. At the low temperature side, the gradient (steepness) of the slope of the photocurrent Iapd with respect to the applied voltage Vapd is large (high); however the gradient (steepness) of the slope decreases as the temperature increases. As illustrated in FIG. 14B, in order to achieve a predetermined multiplication factor, the higher the temperature, the higher the bias voltage applied to the APD. This is because when the temperature rise value $\Delta T$ is 0 or more ($\Delta T \geq 0$), that is, the voltage change amount $\Delta V$ is 0 or more ($\Delta V \geq 0$), the slope of the Vapd versus Iapd characteristic decreases, resulting in an insufficient current bias voltage adjustment amount k. However, the deviation between the channels may converge within a predetermined range by the voltage adjustment loop (steps S32 to S35) according to deviation from the reference value of the amplitude characteristic in each channel.

By contrast, when the temperature rise value $\Delta T$ is smaller than 0 ($\Delta T<0$); that is, when the voltage change amount $\Delta V$ is smaller than 0 ($\Delta V<0$), the slope of the Vapd versus Iapd characteristic increases and the current bias voltage adjustment amount k becomes excessive. In this case, it is desirable to control the reset change amount in such a direction as to reduce the reset change amount. Hence, in FIG. 15, control is performed to change the reset change amount according to the temperature change.

In FIG. 15, the same steps as those in FIG. 13 are denoted by the same reference numerals, and the description of these steps is simplified. First, at the start of operation of the optical receiver 10A or 10B, an initial voltage value applied to the APDs 112-0 to 112-n is set according to the temperature (S11). During the operation of the optical receiver 10A or 10B, the processor 31 acquires the monitored value of the amplitude characteristic in the photoelectric conversion from the monitor circuits such as the current detection circuit 16, the amplitude detection circuit 115 and the like, and determines the reference value among the monitor values (step S32). The processor 31 calculates a deviation from the reference value of the monitored value monitored in each channel (step S33), and determines whether the deviation of each channel falls within a predetermined range (step S34). When there is a channel whose deviation exceeds a predetermined range (NO in step S34), the voltage value of the power supply circuit 15 of the channel is decreased or increased by the step size of the reset setting change amount according to the direction of the deviation so as to reduce the deviation from the reference channel (step S35). Thereafter, the processor 31 returns to step S32 and repeats the processes from step S32 at the next process timing.

When the deviation falls within the predetermined range for all the channels (YES in step S34), the processor 31 acquires the temperature monitor value from the temperature detection circuit 17 (step S36), and resets a bias voltage value corresponding to the temperature for all the channels (step S38). The processor 31 determines whether the amount of change in the APD application reset voltage value is 0 or more (step S41). When the amount of change in the voltage value is equal to or greater than 0 (YES in step S41), the processor 31 returns to step S32, and repeats the processes from step S32 at the next process timing.

An amount of change in the reset bias voltage is smaller than 0 (NO in step S41) indicates that the temperature has changed to a lower temperature, and hence, the processor reduces the resetting change amount (step S42). Thereafter, the processor 31 returns to step S32 and repeats the processes from S32 at the next process timing.

The process illustrated in FIG. 15 may adjust the reset change amount of the bias voltage according to the temperature to match the multiplication factor of the photocurrent between the channels. As a result, it is possible to reduce the adverse effect of crosstalk in multichannel reception, thereby preventing an increase in error rate.

Optimization of APD Photocurrent Multiplication Factor

Figure 16:
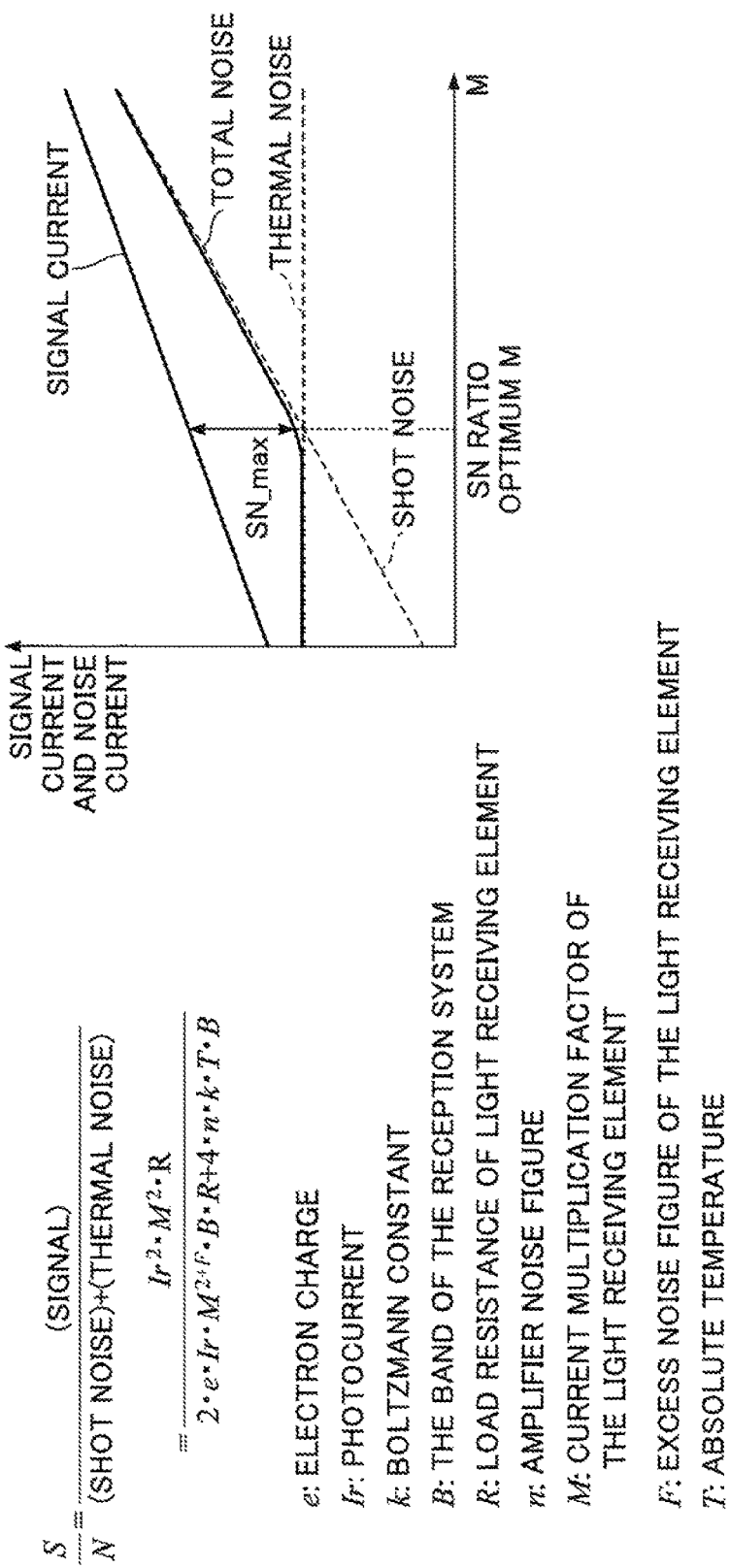
FIG. 16 is a diagram depicting a relationship between the APD current multiplication factor and the SN ratio.

In the following, the optimum value of a photocurrent multiplication factor of the APD 112 will be described with reference to FIGS. 16 and 17. FIG. 16 is a diagram illustrating a relationship between the photocurrent multiplication factor M and the signal-to-noise (S/N) ratio, and FIG. 17 is a diagram illustrating a relationship between the photocurrent multiplication factor M and the band.

Through the first to third embodiments, it is desirable not only to equalize the amplitude characteristics between the channels, but also to optimize the photocurrent multiplication factor of each APD 112. Increasing the photocurrent multiplication factor M increases the signal amplitude; however, as illustrated in FIG. 16, this also increases shot noise. The S/N ratio indicates a ratio of a desired signal to noise, and the noise includes shot noise and thermal noise. Thermal noise is caused by irregular thermal oscillation (Brownian motion) of free electrons in the resistor and is constant and independent of photocurrent multiplication factor M. By contrast, the shot noise increases in proportion to the photocurrent multiplication factor M. Accordingly, it is desirable to set the photocurrent multiplication factor M in consideration of the balance between thermal noise and shot noise.

In FIG. 16, the point at which the difference in signal current with respect to total noise (solid line) representing a combination of thermal noise and shot noise achieves maximum is a point (SN_max) at which the SN ratio is the highest, and the photocurrent multiplication factor M at this point is an optimal M.

Figure 17:
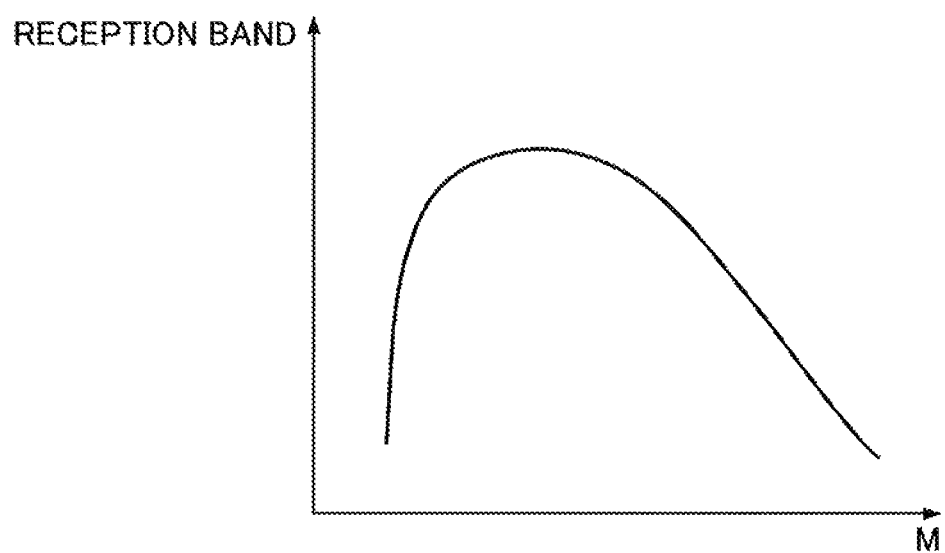
FIG. 17 is a diagram depicting a relationship between the APD current multiplication factor and the SN ratio.

Further, as illustrated in FIG. 17, a receiving band also varies with the photocurrent multiplication factor M. Hence, it is desirable to consider waveform interference due to band deterioration and noise transmission band in setting the photocurrent multiplication factor M.

The voltage setting values corresponding to the temperatures stored in the memory 32 in FIGS. 9 and 12 are determined such that the photocurrent multiplication factor M is optimized (so as to obtain the best S/N ratio) and that the receiving band is stabilized. According to the first to third embodiments, the deterioration of the S/N ratio due to the deviation of the photocurrent multiplication factor from the optimum value may be controlled both in a case where the photocurrent multiplication factor is decreased in a channel with a large current and in a case where the photocurrent multiplication factor is increased in a channel with a small current. That is, even in a case where the photocurrents of all the channels are not necessarily the same, the bias voltage, that is, the photocurrent multiplication factor M is adjusted within a range in which deterioration of the amplitude characteristic due to the effect of the crosstalk is allowable, such that the optical receiver 10A or 10B as a whole may maintain the best reception characteristic.

Application to Optical Transceiver

Figure 18:
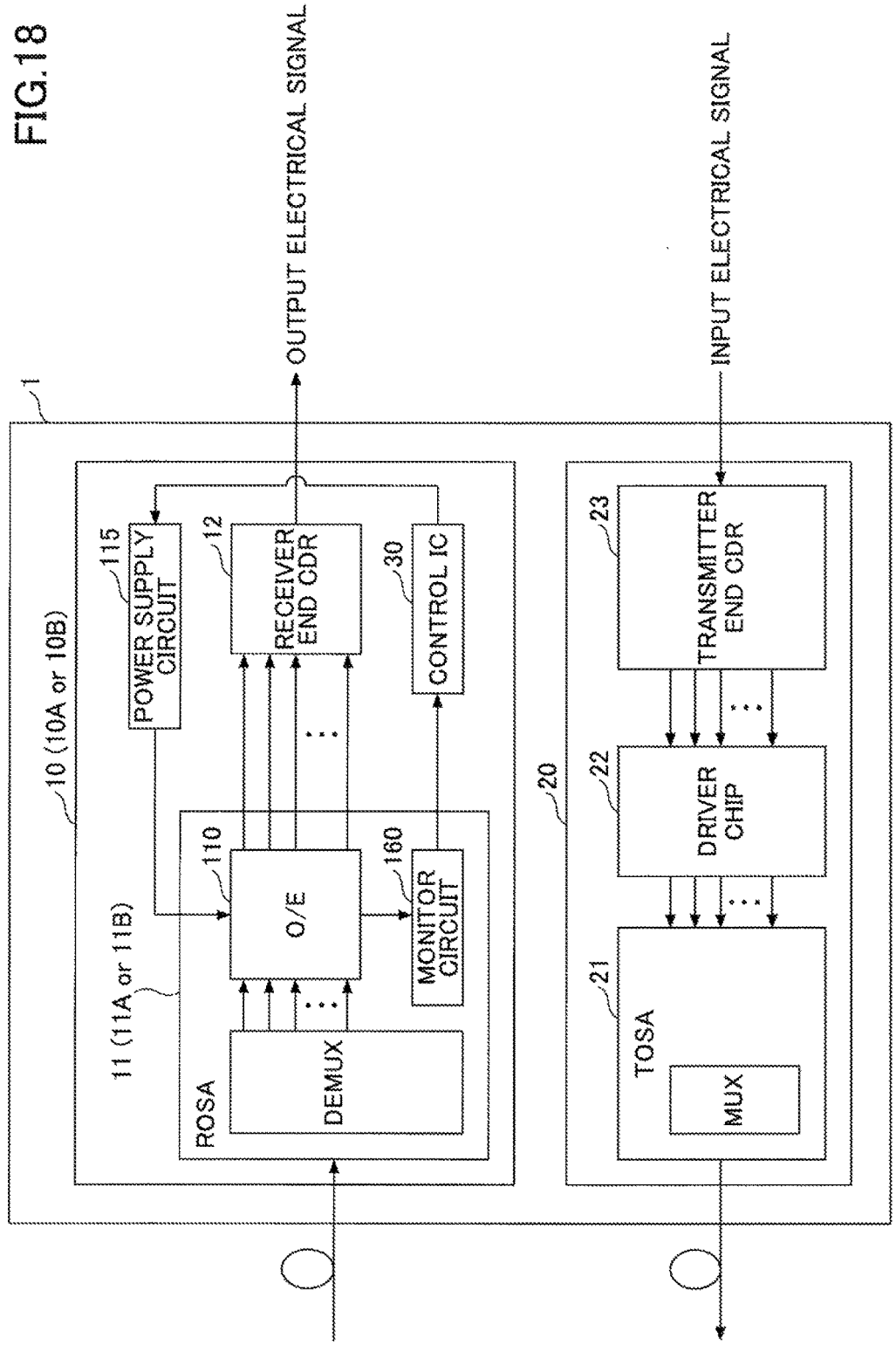
FIG. 18 is a schematic diagram of an optical transceiver using the optical receiver according to the embodiment.

FIG. 18 is a schematic diagram of an optical transceiver 1 to which the optical receiver 10A or 10B of the embodiment is applied. The optical transceiver 1 has an optical receiver 10 and an optical transmitter 20. The optical receiver 10 may be the optical receiver 10A of the first embodiment or the optical receiver 10B of the second embodiment. The optical signal input to the optical receiver 10 is output as an electric signal. The electric signal input to the optical transmitter 20 is output as an optical signal. In FIG. 18, the input/output interface of the electrical signal is omitted because it is not directly related to the invention.

The optical receiver 10 includes an optical reception module (ROSA) 11, a power supply circuit 15, a receiver end CDR 12, and a monitor control IC 30. The optical reception module 11 includes an optical demultiplexer (DEMUX), an optical-electrical (O/E) converter 110, and a monitor circuit 160. The optical transmitter 20 has an optical transmission module (TOSA: transmitter optical subassembly) 21, a driver chip 22, and a transmitter end CDR 23. The control IC 30 may be used in common with the optical transmitter 20. The receiver end CDR 12 and the transmitter end CDR 23 may be formed as one chip.

The optical signal input to the optical receiver 10 is demultiplexed for each channel by the optical demultiplexer (DEMUX) of the optical reception module 11, converted into electrical signals by the O/E converter 110, which then receive waveform-shaping and data determination by the CDR 12. Data reproduced by the CDR 12 is output as an electric signal.

The O/E converter 110 has an APD 112 acting as a photodetector (light receiving element) for each channel. The reverse bias applied to the APD is supplied from the power supply circuit 15. For the purpose of convenience of illustration, a voltage line input from the power supply circuit 15 to the O/E converter 110 is described by a single line. However, as described with reference to FIGS. 6 and 10, an individual bias voltage is applied to each APD. The photocurrent output from the APD is amplified to a voltage signal of a level suitable for the CDR 12 in the preamplifier 113 (see FIGS. 6 and 10), and is output to the CDR 12.

The amplitude characteristic (optical input characteristic) of each channel in the O/E converter 110 is monitored by the monitor circuit 160. The amplitude characteristic of the O/E converter 110 may be of a photocurrent flowing in the APD or of a voltage signal generated by the preamplifier 113. In the example of FIGS. 14A and 14B, a positive voltage is applied from the power supply circuit 15 to the cathode of the APD. The monitor result is supplied to the control IC 30. The control IC 30 controls the bias voltage applied to the APD based on the monitoring result of each channel such that the deviation in the optical input characteristics between the channels is minimized or falls within a predetermined range. The control signal output from the control IC is supplied to the power supply circuit 15, and the bias voltage applied to each APD is adjusted. Thus, even when the multichannel APD and the preamplifier 113 are integrated in the optical reception module 11, it is possible to reduce an adverse effect of crosstalk before input to the CDR 12.

In the optical transmitter 20, an electrical signal representing data is waveform-shaped by the CDR 23, converted into high-speed drive signals by the driver chip 22, and input into the optical transmission module 21. Since the configuration of the optical transmission module 21 is not directly related to the present invention, an illustration of a specific configuration is omitted. However, an optical modulator and a laser diode as a light source may, for example, be integrated in the optical transmission module 21, and an optical signal modulated by an input drive signal may be output for each channel. The optical signals for each channel are multiplexed by an optical multiplexer (MUX) to be output.

The optical transceiver using the optical receiver 10A or 10B of the embodiment is compact and the adverse effect of crosstalk between received signals is controlled.

The modifications described in the first embodiment may also apply to the second embodiment. Further, in the first embodiment and the second embodiment, when the temperature change is large, the bias voltage may be reset in all the channels so as to quickly allow the inter-channel deviation to be converged within the predetermined range as illustrated in the third embodiment. In the first embodiment and the second embodiment, the resetting amount of change of the bias voltage applied to the APD according to the direction of the temperature change may be adjusted so as to optimize the control of the photocurrent multiplication factor as illustrated in the modification of the third embodiment.

The disclosed embodiments and modifications may provide, a compact optical receiver configured to receive multichannel optical signals that is capable of reducing an adverse effect of crosstalk between channels.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An optical receiver comprising:
a demultiplexer configured to output optical signals for a plurality of channels by demultiplexing of an optical signal input to the optical receiver;
a photoelectric converter including a number of avalanche photodiodes corresponding to the plurality of channels, the photoelectric converter being configured to convert an optical signal from the demultiplexer into an electric signal for each channel by a corresponding one of the avalanche photodiodes;
a monitor circuit configured to monitor an amplitude characteristic of the electric signal for each channel from the photoelectric converter, and output a monitored result indicating the amplitude characteristic of the electric signal for each channel; and
a control circuit configured to control bias voltages to be applied to the avalanche photodiodes, based on the amplitude characteristics of the electric signals for the channels indicated by the monitored results from the monitor circuit, respectively, to minimize an amount of variability in the amplitude characteristic between the channels or make the amount of variability in the amplitude characteristic between the channels fall within a predetermined range.

2. The optical receiver as claimed in claim 1, wherein the control circuit determines a reference channel from among the plurality of channels based on the monitored results and controls the bias voltage to be applied to each of the avalanche photodiodes to minimize a deviation of the amplitude characteristics for the channels with respect to an amplitude characteristic for the reference channel or make the deviation of the amplitude characteristics for the channels with respect to the amplitude characteristic for the reference channel fall within a predetermined range.

3. The optical receiver as claimed in claim 2, wherein the control circuit calculates a ratio of a monitored result of each channel to a monitored result of the reference channel and controls the bias voltage to be applied to each of the avalanche photodiodes to make a value of the ratio fall within a predetermined range.

4. The optical receiver as claimed in claim 1, wherein the amplitude characteristic indicates an amplitude of a photocurrent flowing through one of the avalanche photodiodes, and
the monitor circuit detects the amplitude of the photocurrent for each of the avalanche photodiodes to output amplitude information indicating the amplitude of the photocurrent for each of the avalanche photodiodes to the control circuit.

5. The optical receiver as claimed in claim 1, wherein the photoelectric converter includes amplifiers connected to outputs of the avalanche photodiodes, respectively,
the amplitude characteristic indicates an amplitude of a voltage signal generated by one of the amplifiers, and
the monitor circuit detects the amplitude of the voltage signal from each of the amplifiers to output amplitude information indicating the amplitude of the voltage signal from each of the amplifiers to the control circuit.

6. The optical receiver as claimed in claim 1, further comprising:
a voltage circuit configured to apply a reverse bias voltage to each of the avalanche photodiodes, wherein
the control circuit controls the reverse bias voltage generated by the voltage circuit based on the monitored results from the monitor circuit.

7. The optical receiver as claimed in claim 1, further comprising:
a memory configured to record a voltage change amount for adjusting each of the bias voltages, wherein
the control circuit controls each of the bias voltages using a corresponding one of the voltage change amounts from the memory.

8. The optical receiver as claimed in claim 7, further comprising:
a temperature detection circuit, wherein
the control circuit controls each of the bias voltages by referring to the memory and selecting one of the voltage change amounts according to a temperature detected by the temperature detection circuit.

9. The optical receiver as claimed in claim 1, further comprising:

a temperature detection circuit, wherein
the control circuit resets each of the bias voltages when a temperature detected by the temperature detection circuit has changed to exceed a predetermined range from an initial temperature.

10. The optical receiver as claimed in claim 1, further comprising:
a temperature detection circuit, wherein
the control circuit reduces a voltage change amount for adjusting each of the bias voltages when a temperature detected by the temperature detection circuit has changed to a low temperature side.

11. The optical receiver as claimed in claim 1, wherein the optical signal input to the optical receiver is a wavelength multiplexed signal or a spatially multiplexed signal.

12. An optical transceiver comprising:
the optical receiver as claimed in claim 1; and
an optical transmitter.

13. A method for controlling reception of an optical signal by an optical receiver, the method comprising:
receiving optical signals for a plurality of channels, which are produced by demultiplexing of an optical signal input to the optical receiver, at avalanche photodiodes of a photoelectric converter, respectively;
monitoring, by a monitor circuit, an amplitude characteristic of an electric signal for each channel, which is produced by photoelectric conversion of one of the optical signals by a corresponding one of the avalanche photodiodes, so that the monitor circuit outputs a monitored result indicating the amplitude characteristic of the electric signal for each channel; and
controlling, by a control circuit, bias voltages to be applied to the avalanche photodiodes, based on the amplitude characteristics of the electric signals for the channels indicated by the monitored results from the monitor circuit, respectively, to minimize an amount of variability in the amplitude characteristic between the channels or make the amount of variability in the amplitude characteristic between the channels fall within a predetermined range.

* * * * *